Nov. 7, 1950     M. D. AUMAN     2,528,991
BOBBY PIN HOLDER AND OPENER
Filed Nov. 29, 1948
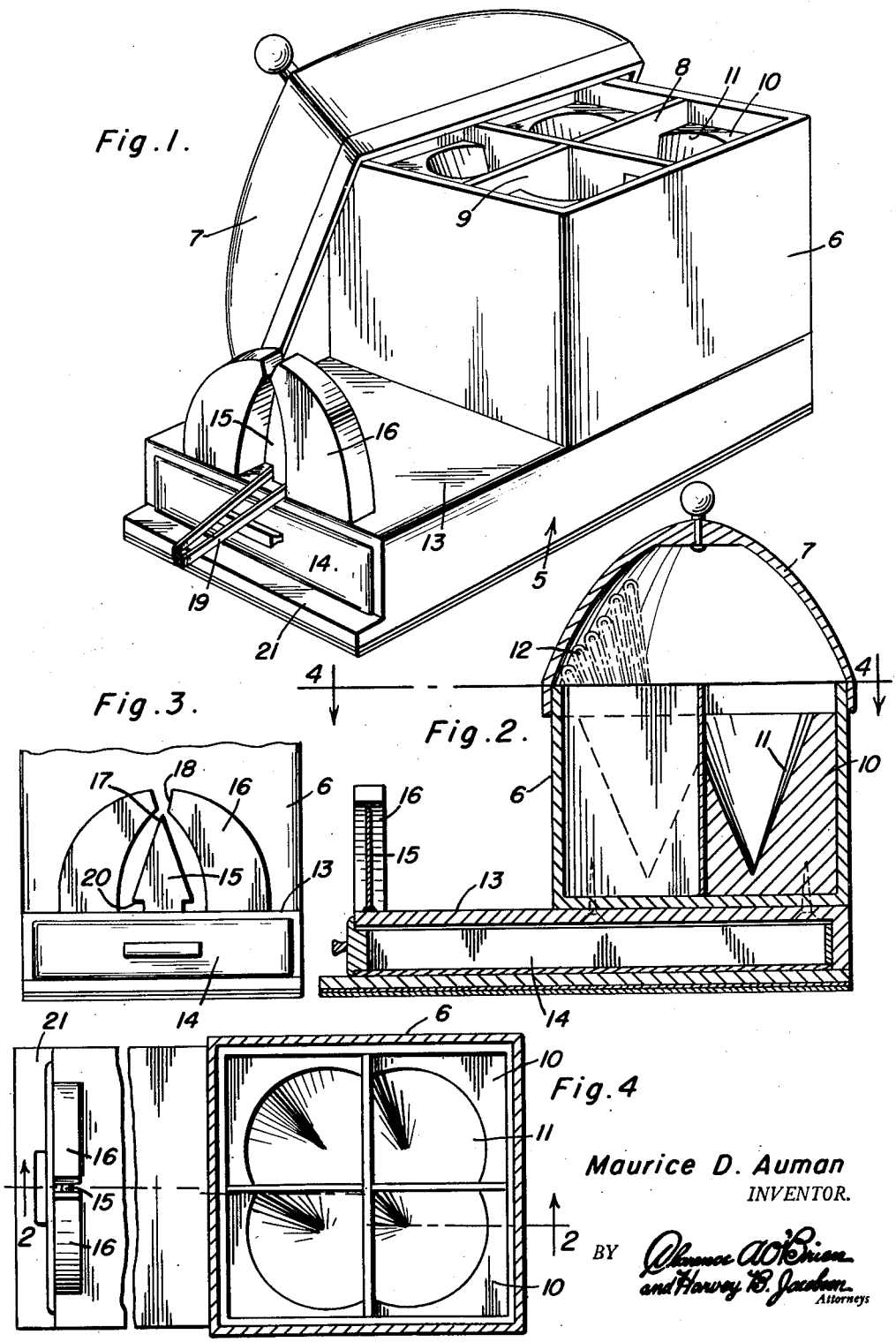
Maurice D. Auman
INVENTOR.

Patented Nov. 7, 1950

2,528,991

UNITED STATES PATENT OFFICE 2,528,991

BOBBY PIN HOLDER AND OPENER

Maurice D. Auman, Belvidere, Ill.

Application November 29, 1948, Serial No. 62,574

4 Claims. (Cl. 132—1)

The present invention relates to new and useful improvements in devices for spreading or opening bobby pins, hair pins, or similar devices having a pair of resilient tines held under tension closely against each other in a closed position.

Under the present practice of using bobby pins there is considerable difficulty in spreading the tines of the pins especially when one hand is occupied, such as when holding the hair in position to receive the bobby pin. This leaves only one hand available to spread the tines of the pins and as a result the fingernails or teeth are resorted to and in some instances the edge of furniture is used as an instrumentality to spread the tines apart. The various disadvantages of such practice is obvious and fingernails become broken, teeth enamel chipped and the furniture becomes scarred.

It is accordingly an object of the present invention to avoid this objectionable practice and to provide a device whereby the tines of the bobby pin may be spread apart by one hand of a person.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a longitudinal sectional view;

Figure 3 is a fragmentary front elevational view, and

Figure 4 is a top plan view with the lid removed.

Referring now to the drawing in detail wherein for the purpose of illustration I have disclosed a preferred embodiment of the invention the numeral 5 designates the combined bobby pin opener and holder generally and which is constructed in the form of a case 6 having its top closed by a removable lid 7. The inside of the case is formed with partitions 8 separating the same into a plurality of compartments 9.

A removable block 10 is positioned in each compartment and is formed with a substantially conical recess 11 in which a plurality of bobby pins 12 may be supported in an upstanding position for conveniently grasping and removing the bobby pins from the several compartments.

A hollow platform extends forwardly from the case 6 in the front of which a sliding drawer 14 is positioned and supported in an upstanding position on the front portion of platform 13 is a bobby pin spreading device of substantially arrow or spear-head shape indicated at 15.

Also supported in an upstanding position on the platform 13 at each side of the spreader 15 is an arcuate guide 16 and with the upper ends of the guides positioned in spaced relation with respect to each other above the pointed end 17 of the bobby pin spreader 15 to form an entrance slot or opening 18 between the upper ends of the guides.

The slot or opening 18 is of a flared construction to facilitate placing of the free ends of a bobby pin therebetween and in a position for engaging the pointed end 17 of the spreader 15 between the tines 19 of the bobby pin to spread the tines apart by forcing the bobby pin downwardly at the sloping side edges of the spreader 15.

As the tines 19 move downwardly at the side edges of the spreader 15 the tines are engaged under the shoulders 20 at the lower edge of the spreader so that the bobby pins may be held in a forwardly projecting position, as shown in Figure 1 of the drawing, without danger of the tines again closing until the bobby pin is picked up and placed in the hair.

The bobby pin may be placed in the entrance slot or opening 18 and moved downwardly on the spreader 15 with one hand while the other hand remains free for other purposes.

The bottom of the case 5 projects forwardly, as shown at 21, to prevent forward tipping of the case during pressure exerted on the front end thereof by forcing the bobby pin downwardly on the spreader.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bobby pin opener comprising a spreader of substantially arrow-head shape for spreading the tines of a bobby pin to open the pin by forcing the tines along the edges of the spreader, and a pair of guide members positioned at the opposite side edges of the spreader and converging at their upper ends to form an entrance opening leading to the pointed end of the spreader for guiding a bobby pin toward the point of the spreader.

2. A bobby pin opener comprising a spreader of substantially arrow-head shape for spreading the tines of a bobby pin to open the pin by forcing the tines along the edges of the spreader, and guide means for the bobby pin positioned outwardly at each side of the spreader, said guide means having spaced apart outer ends adjacent the pointed end of the spreader forming an entrance for a bobby pin leading to the spreader.

3. A bobby pin opener comprising a spreader of substantially arrow-head shape for spreading the tines of a bobby pin to open the pin by forcing the tines along the edges of the spreader, and guide means for the bobby pin positioned outwardly at each side of the spreader, said guide means having a guide opening at their outer ends to guide a bobby pin toward the point of the spreader.

4. A bobby pin opener comprising a spreader including a base structure and a blade of substantially arrow-head shape rising from the base, a guide at each edge of the blade, and an entrance for a bobby pin between the upper ends of the guides leading to the point of the blade.

MAURICE D. AUMAN.

REFERENCES CITED

The following references are of record in the file of this patent:

UNITED STATES PATENTS

| Number | Name | Date |
|---|---|---|
| D. 153,758 | Bennett | May 17, 1949 |
| D. 153,810 | Koslap | May 17, 1949 |
| 1,733,565 | Tobita | Oct. 29, 1929 |
| 1,805,045 | Lower | May 12, 1931 |
| 2,438,172 | Johnson | Mar. 23, 1948 |
| 2,484,313 | Rennecamp et al. | Oct. 11, 1949 |
| 2,460,562 | Worrell | Feb. 1, 1949 |

FOREIGN PATENTS

| Number | Country | Date |
|---|---|---|
| 803,599 | France | July 15, 1936 |